A. HOECKER.
TIRE RIM.
APPLICATION FILED FEB. 16, 1918.
1,299,727.
Patented Apr. 8, 1919.
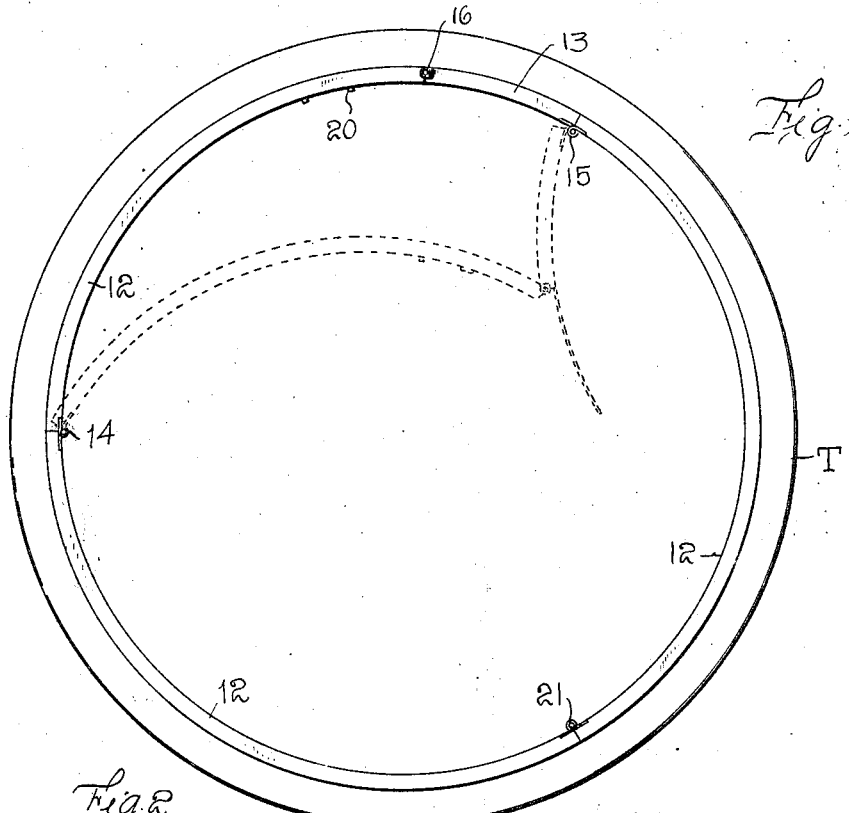
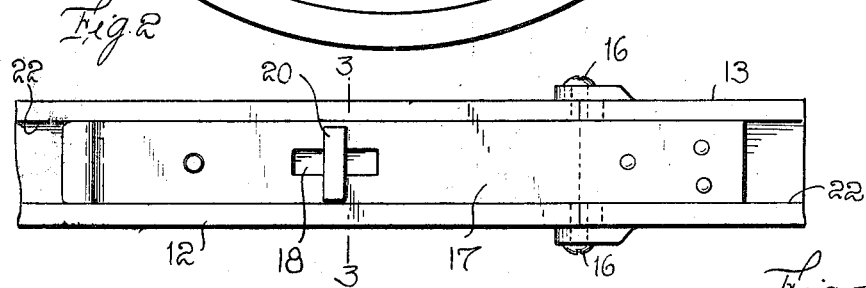
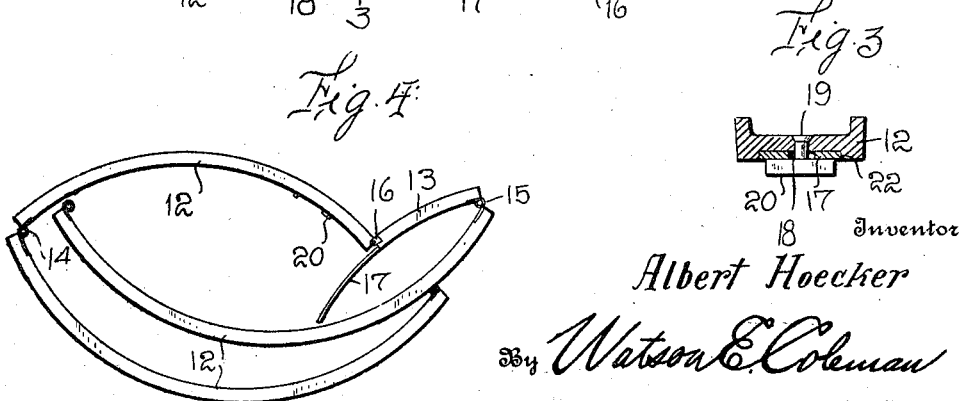
Inventor
Albert Hoecker
By Watson E. Coleman
Attorney

UNITED STATES PATENT OFFICE.

ALBERT HOECKER, OF COLLINSVILLE, ILLINOIS.

TIRE-RIM.

1,299,727.  Specification of Letters Patent.  Patented Apr. 8, 1919.

Application filed February 16, 1918. Serial No. 217,582.

*To all whom it may concern:*

Be it known that I, ALBERT HOECKER, a citizen of the United States, residing at Collinsville, in the county of Madison and State of Illinois, have invented certain new and useful Improvements in Tire-Rims, of which the following is a specification, reference being had to the accompanying drawings.

This invention relates to an improved tire rim and has for its primary object to provide a rim which is so constructed that it may be easily and quickly applied to the tire or removed, without necessitating the use of special tools.

It is a more particular object of the invention to provide a tire rim consisting of a series of hingedly connected sections, one of the sections being of appreciably less length than the others and permitting of the inward buckling or collapse of the rim without disconnecting the adjacent rim sections.

It is also another important object of the invention to provide a tire rim the several sections of which can be very compactly arranged when the rim is not in use whereby the rim may be packed or stored away in a relatively small space.

And it is a further general object of my invention to provide a wheel rim as above characterized, which is light in weight, strong and durable in its construction and can be manufactured at comparatively small cost.

With the above and other objects in view the invention consists in the improved combination, construction and arrangement of the several parts as will be hereinafter more fully described, subsequently claimed and illustrated in the accompanying drawings, in which similar reference characters designate corresponding parts throughout the several views and wherein, Figure 1 is a side elevation of my improved rim applied to a wheel tire and illustrating in dotted lines the manner in which the rim is moved from the tire.

Fig. 2 is an enlarged plan view showing the locking means for the tire rim sections;

Fig. 3 is a section taken on the line 3—3 of Fig. 2 and

Fig. 4 is a side elevation of the rim folded.

The tire rim which I will now proceed to describe in detail, is in part a continuation of the subject matter shown and described in my pending application for patent filed October 15, 1917, Serial No. 196,716. In the said application, there is disclosed a plurality of arcuate tire rim sections 12 and an additional relatively short rim section 13. Two of the rim sections 12 are connected to each other at their inner faces by means of a hinge indicated at 14 and the other rim section 12 is connected to one end of the short rim section 13 by means of a similar hinge 15. As will be at once seen, these hinges will permit of the relative inward folding movement of the several rim sections but prevent their relative outward movement. The other end of the short rim section 13 is connected to the end of one rim section 12 by two pivot pins 16 which extend transversely through the end of the rim section 12. The opposed end of the rim section 13 is bifurcated to provide ears or lugs which are apertured to receive the ends of the pivots 16.

The several rim sections 12 and 13 are each provided in its inner face with a longitudinally extending groove or channel indicated at 22. To the base wall of this channel in the rim section 13 one end of a metal plate 17 is securely riveted, said plate projecting beyond the pivot 16 longitudinally of the rim and having a slot 18 formed in its other end. When the several rim sections are disposed in circumferential alinement as in Fig. 1 this slotted end of the plate 17 is received within the groove or channel 22 of the adjacent rim section 12. A stud 19 is rotatably fixed to the base wall of this rim section and is formed with an elongated head 20 adapted for engagement through the slot in the plate 17. Upon the rotation of the pin to dispose the head 20 at right angles to the slot, it will be readily seen that the several rim sections may be locked in circumferential alinement with each other. The plate 17 prevents the inward folding movement of the rim sections 12 and 13 which are connected by the pivots 16, so that these rim sections can move relative to each other only in an outward direction when the head 20 is rotated to release the plate 17.

The other two rim sections 12 are provided upon their opposite ends with suitable knuckles which are adapted to be disposed in registering relation with the several sections of the rim or in circumferential alinement to receive a removable pin indicated at 21.

As shown in Fig. 1 of the drawings, when the rim is to be applied to the wheel tire, the several sections of the rim are arranged within the tire indicated at T, the rim sections 12 and 13 connected by the pivot 16 being forced inwardly at the joint between said rim sections whereby the rim is sufficiently contracted to permit of its insertion within the tire. Pressure is then exerted upon the pivotally connected ends of these rim sections and they are forced outwardly toward the tire and into circumferential alinement with the other rim sections so that all of the rim sections will be properly engaged against the inner face of the tire wall. I have illustrated in the drawing a rim adapted for use in connection with a tire having straight sides, but it will of course be understood that the rim sections may be of other cross sectional form and employed in connection with different types of wheel tires. It frequently happens that the tire will adhere to the rim by rust of the latter or through other causes and it is then very difficult to remove the tire from the rim. By means of my invention, however, such removal may be easily and quickly effected by simply turning the head 20 into alinement with the slot in the end of the plate 17 and then urging the pivotally connected ends of the rim sections 12 and 13 inwardly. It will be understood that the connecting pintle 21 between the rim sections 12 is not removed, but the several rim sections remain connected. When the rim is thus buckled or collapsed inwardly, it may be sufficiently contracted to permit of the ready removal of the tire therefrom. When the several rim sections are connected and in circumferential alinement with each other, the end of the plate 17 and the head of the pin 19 are entirely disposed within the channel of the rim section 12. Thus there will be no obstruction projecting from the inner face of the rim which would interfere with its proper arrangement on the wheel felly. In connection with my improved tire rim, any desired means may be employed for retaining said rim in its applied position on the felly of the wheel.

When the tire rim is not being used, the pin 21 is removed, the joint 16 broken so as to fold the rim sections 12 and 13 connected thereby in an outward direction and the other two rim sections 12 are then folded inwardly upon each other in the manner shown in Fig. 3 of the drawing. Thus the several sections of the rim may be compactly folded or collapsed and the rim stored or packed away in the body of the vehicle in a relatively small space.

From the foregoing description taken in connection with the accompanying drawings, it will be seen that I have devised a very simple and durably constructed tire rim upon which the tire may be easily and quickly arranged and from which it may be as readily removed. In practical use I have found the invention to be highly effective and reliable and to also obviate a very considerable amount of manual labor and expenditure of time incident to the application and removal of the tire from the rim.

While I have herein shown and described the preferred construction and arrangement of the various parts of the device it is to be understood that the same are susceptible of considerable modifications and I, therefore, reserve the privilege of adopting all such legitimate changes as may be embodied within the spirit and scope of the invention as claimed.

Having thus fully described my invention, what I desire to claim and secure by Letters Patent is:—

A tire rim comprising a plurality of arcuate rim sections hingedly connected to each other and an additional relatively short rim section permanently hinged to two of the first named rim sections, each of the rim sections being provided with a longitudinal channel in its inner face, a plate fixed to one end of the shorter rim section and projecting longitudinally beyond the end thereof and over the hinge connection for engagement in the channel of an adjacent rim section to prevent the relative outward folding movement of said rim sections but permitting of their relative inward movement, and means on the longer rim section to coact with said plate and hold the several rim sections in circumferential alinement when applied to the tire.

In testimony whereof I hereunto affix my signature in the presence of two witnesses.

ALBERT HOECKER.

Witnesses:
SIMON ROBINSON,
GUST HOLZWEG.